United States Patent [19]

Beuchat

[11] 4,087,774
[45] May 2, 1978

[54] INFORMATION TRANSMITTING SYSTEM
[75] Inventor: Roger Beuchat, Gland, Switzerland
[73] Assignee: Mefina S.A., Fribourg, Switzerland
[21] Appl. No.: 703,133
[22] Filed: Jul. 7, 1976
[30] Foreign Application Priority Data
　　　Jul. 9, 1975　Switzerland ............... 8935/75
[51] Int. Cl.² ............................................. H01F 27/28
[52] U.S. Cl. ................................... 336/73; 336/96; 336/DIG. 2
[58] Field of Search .............. 336/73, 75, 79, 84, 336/DIG. 2, 96, 212

[56] References Cited
U.S. PATENT DOCUMENTS

| | | | |
|---|---|---|---|
| 1,954,470 | 4/1934 | Carlson | 336/73 X |
| 2,118,137 | 5/1938 | Bartlett | 336/73 X |
| 2,553,324 | 5/1951 | Lord | 336/73 |
| 2,630,560 | 3/1953 | Earl et al. | 336/73 X |
| 3,020,502 | 2/1962 | Graham | 336/73 |
| 3,534,310 | 10/1970 | Pelissier | 336/DIG. 2 |
| 3,550,682 | 12/1970 | Fowler | 336/DIG. 2 |
| 3,566,202 | 2/1971 | Carr | 336/84 C |
| 3,665,356 | 5/1972 | Douglas | 336/73 |
| 3,682,098 | 8/1972 | Spies | 336/DIG. 2 |
| 3,743,989 | 7/1973 | Nicolas | 336/DIG. 2 |

Primary Examiner—Thomas J. Kozma
Attorney, Agent, or Firm—Emory L. Groff, Jr.

[57] ABSTRACT

An information transmitting system by means of a coded magnetic signal permitting adjusting the options in a fuze. A primary winding magnetically induces a coded current in a secondary winding located within a housing. A conductive short-circuit ring is located between both windings for concentrating the magnetic flux within the receiving winding, and thus reducing the magnetic losses.

2 Claims, 2 Drawing Figures

INFORMATION TRANSMITTING SYSTEM

Known apparatuses for transmitting information by magnetic induction comprise usually at least two substantially coaxial windings, wherein one of said windings produces an alternating magnetic field coded for defining the information to be transmitted, the other winding being sensitive to said magnetic field, at least one of said windings being located in a housing.

The aim of the invention is to reduce the losses of magnetic energy by modifying the magnetic flux path between both windings.

According to the invention, the system comprises at least a ring of non ferro-magnetic conducting material coaxially located between said two windings.

Other objects and features of the invention will become apparent from the following description of the invention when considered in conjunction with the accompanying drawings, in which.

Figure 1:
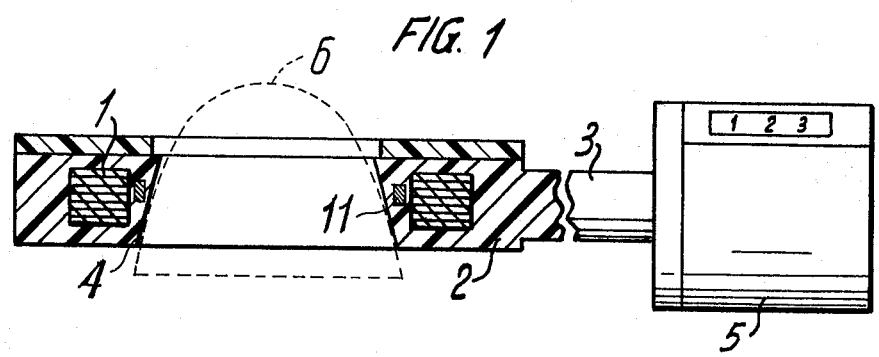
FIG. 1 is a partly sectional view of an information transmitting apparatus.
Figure 2:
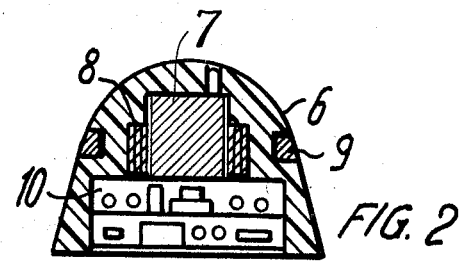
FIG. 2 is a sectional view of a part of an information receiving system which could be incorporated in the fuze of a projectile.

The transmitting apparatus comprises a winding 1 located within a ring-shaped housing 2 secured to a rod or stick 3 attached to an electrical device 5. Housing 2 and rod 3 are made from non-conductive non-magnetic material such as plastic. The housing 2 is provided with a frusto-conical hole 4. The device 5 comprises the electrical circuits needed for supplying to winding 1 the electrical signal defining the information to be transmitted.

The receiving apparatus comprises a cylindrical core 7 of ferro-magnetic material associated with a winding 8. A ring 9 of non ferro-magnetic conductive material such as copper is embedded in the housing 6 and located substantially at the same level as core 7. Housing 6 is made from non-conductive non-magnetic material such as plastic. An electronic circuit 10, not shown in detail, is provided for receiving and treating the electric signal induced into winding 8.

The housing 6 has an outer contour matching with the frusto-conical hole 4 of housing 2. Thus, the housing 2 may be applied around the housing 6 so that the housing 6 will be in the position shown in dotted line in FIG. 1. In this position winding 1 is located coaxially to the winding 8, and the ring 9 is between the two windings.

The conductive ring 9 is the equivalent of a short-circuit loop situated between the two windings of a magnetic coupling. The current in winding 1 produces an induced short-circuit current in the ring 9, wherein said induced current produces a secondary magnetic field having a polarity opposite to the polarity of the magnetic field inducing said short-circuit current. This secondary magnetic field causes a deflection of the magnetic lines of the primary field towards the axis of ring 9, so that a concentration of the magnetic field in the inner portion of winding 8 is obtained.

This particular arrangement increases the intensity of the magnetic field passing within the receiving winding whereby magnetic losses are diminished.

In order to increase the concentrating effect of the field, a second conductive ring 11 may be provided in the housing 2 between the winding 1 and the wall of the frusto-conical hole 4. Such an arrangement would provide two short-circuit loops between both windings.

When the housing 6 is made of plastic material, the winding 8 and the ring 9 are automatically held in their correct respective position.

The system described in particularly adapted for transferring to a projectile fuze information regarding detonation options and fuzing options. The magnetic coupling system may therefore be used for transmitting electical energy to the fuze for charging an electrical source such as condenser. In certain appliances, the housing 2 could be secured to the gun provided for firing the projectile, said latter being provided with the housing 6.

I claim:

1. Means for transmitting information by magnetic induction comprising at least two windings, each of toric shape and of different diameters, a first one of said windings being capable of producing an alternating magnetic field and a second one of picking up said field, the first winding adapted to be placed in a position surrounding the second winding and co-planer therewith, each winding disposed in a housing of non-magnetic non-conductive material, the two windings being separable from one another; wherein said means includes a ring of non ferro-magnetic metal disposed substantially coaxially between the two windings when the first winding is in said position surrounding the second winding, said ring being embedded in one of said housings, said ring providing a short circuit loop and producing a secondary magnetic field which causes a deflection of the magnetic lines of the primary field toward the axis of the ring to produce a concentration of the magnetic field in the inner portion of the second winding, thereby reducing magnetic losses.

2. Means according to claim 1, wherein each housing comprises a non ferro-magnetic metallic ring, each ring being arranged so that the two rings are located between the two windings when the first winding is in said position surrounding the second winding.

* * * * *